United States Patent
Kelly

(10) Patent No.: US 7,242,106 B2
(45) Date of Patent: Jul. 10, 2007

(54) METHOD OF OPERATION FOR A SELF-PROTECTING WAVE ENERGY CONVERSION PLANT

(76) Inventor: Hugh-Peter Granville Kelly, 47 Crowstone Road, Westcliff on Sea, Essex SS0 8BG (GB)

(*) Notice: Subject to any disclaimer, the term of this patent is extended or adjusted under 35 U.S.C. 154(b) by 0 days.

(21) Appl. No.: 10/564,634

(22) PCT Filed: Jul. 16, 2004

(86) PCT No.: PCT/GB2004/003113

§ 371 (c)(1),
(2), (4) Date: Jun. 13, 2006

(87) PCT Pub. No.: WO2005/012723

PCT Pub. Date: Feb. 10, 2005

(65) Prior Publication Data

US 2007/0080539 A1    Apr. 12, 2007

(30) Foreign Application Priority Data

Jul. 18, 2003 (GB) .................................. 0316869.7

(51) Int. Cl.
*F03B 13/12* (2006.01)
*H02P 9/04* (2006.01)

(52) U.S. Cl. ................................... 290/42; 290/53

(58) Field of Classification Search .................. 290/42, 290/43, 53, 54; 415/7; 405/76; 417/330, 417/331; 416/85; 60/498, 497, 500, 501, 60/505

See application file for complete search history.

(56) References Cited

U.S. PATENT DOCUMENTS

| | | | | |
|---|---|---|---|---|
| 1,061,061 A | * | 5/1913 | Frame | 60/505 |
| 3,335,667 A | * | 8/1967 | Murphy | 417/246 |
| 3,567,953 A | * | 3/1971 | Lord | 290/42 |
| 4,425,510 A | * | 1/1984 | Jury | 290/42 |
| 6,644,027 B1 | * | 11/2003 | Kelly | 60/498 |
| 7,168,532 B2 | * | 1/2007 | Stewart et al. | 188/161 |
| 2005/0099010 A1 | * | 5/2005 | Hirsch | 290/42 |

FOREIGN PATENT DOCUMENTS

| | | |
|---|---|---|
| EP | 0 496 146 | 7/1992 |
| WO | WO 01/06118 | 1/2001 |
| WO | WO 01/06119 | 1/2001 |

OTHER PUBLICATIONS

International Search Report for PCT/GB2004/003113 dated Nov. 2, 2004.

* cited by examiner

*Primary Examiner*—Julio Gonzalez
(74) *Attorney, Agent, or Firm*—Nixon & Vanderhye P.C.

(57) ABSTRACT

A wavefarm (10) comprises a multiplicity of wave energy converters, comprising linear generators (19, 20, 21) and (22) which are driven by floats immersed in the sea, (14). In normal wave conditions, all of the generators supply a land line (17) via a control unit (18). In the event of inclement conditions, one or more of the generators are switched to linear motors, and these are then powered by those generators remaining in the sea, to withdraw their floats into protective cavities (23). The process is repeated sequentially until all but the last one or few of the generators have withdrawn their floats. Finally, these last are withdrawn by connecting them to an alternate power source e.g. a battery, (24), again via the control unit (18).

6 Claims, 4 Drawing Sheets

METHOD OF OPERATION FOR A SELF-PROTECTING WAVE ENERGY CONVERSION PLANT

This application is the US national phase of international application PCT/GB2004/003113 filed 16 Jul. 2004 which designated the U.S. and claims benefit of GB 0316869.7 filed 18 Jul. 2003, the entire contents of each of which are hereby incorporated by reference.

The following invention relates to wave energy conversion plants, otherwise known as wave farms, as may be established in the seas for capturing and converting sea wave energy to electricity.

In my EP1196691 and EP 1196690, means are described for converting the energy of sea waves into electricity by the use of 'point absorbers' or, as they are more commonly known and referred to herein, floats. The floats, as they undulate up and down with the motion of sea waves acting upon them, cause relative movement between the stator(s) and armature(s) of one or more linear generators. The wave energy is thus converted directly into electricity.

In the first of the two aforementioned applications, means are disclosed for safeguarding a wavefarm (comprising one or more floats driving one or more linear generators) by reversing the mode of the linear generators to become linear motors. The linear motors are then used to extract the floats —in the event of inclement or storm conditions—into protective cavities until the storm abates. Electrical power is clearly necessary to supply the (now) linear motors for this purpose. It may not be possible—or indeed desirable—to withdraw all of this power from the land-grid normally fed by the wavefarm when in generating mode.

According to the invention, a self protecting wavefarm comprises a number of wave energy converters, each converter comprising at least one float and being operable to move the or each float thereof between a first, electricity-generating, position at which the float is immersed in sea waves for driving mechanical to electrical energy conversion by the converter and a second, protected position at which the movement of the float by sea waves is reduced or eliminated; and a control arrangement for effecting coordinated sequential operation of the converters to move their respective float or floats between their first and second positions in case of inclement sea conditions, the control arrangement being operative such that while the float or floats of at least one converter remain in the electricity generating position, the electrical energy generated by at least one such converter is used to power the other converter or converters to move their float or floats to their second positions, and thereafter, for at least one converter, for which no further converter would remain in a generating condition to supply the necessary power, the power to move its float or floats to their second position is supplied by an alternate source of energy.

In practice, the second position into which the floats are placed to protect them in the event of inclement conditions may be realised by changing the elevation of the floats, such as raising them into protective cavities, or submerging them in the sea.

It will be appreciated that although sea storms may rise quite quickly, it takes measurable time for them to reach their full ferocity.

The physical process of protecting the floats may take place on sequential row by row basis, until all but the last one or two converters have been operated upon. The alternate source of energy for raising the last of the converters may be an onboard unit, such as a storage battery or an electrical generator. It will be appreciated that the power for this operation may take place assisted —should it be so desired—by electricity supplied from a land-line or similar, if available.

It will be appreciated that the concept of the invention disclosed herein is readily applicable to wavefarms equipped with linear generators, as mentioned previously. In the event of storm conditions, the electrical energy generated by the still operative converters is simply supplied to other converters —now operating in linear motor mode—for the successful extraction or submersion of their respective floats.

The invention will now be described with reference to the accompanying drawings in which:—

Figure 1:
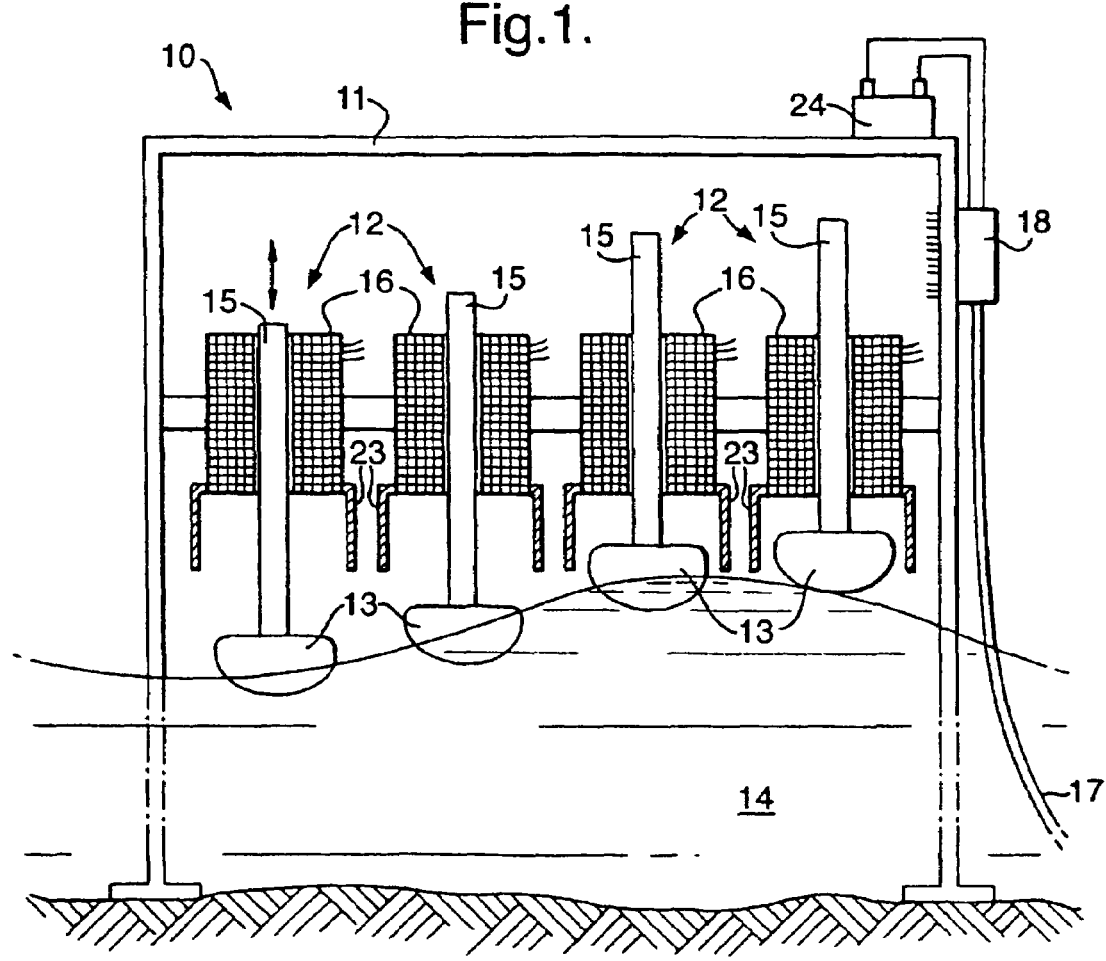
FIG. 1 shows a wavefarm equipped with a multiplicity of wave energy converters.

Referring to FIG. 1, a wavefarm is depicted at 10 comprising a tower-like structure 11 for supporting a number of wave energy converters 12. Each of these comprises a float 13 immersed in sea waves 14 and used to drive the armature 15 of a linear generator relative to its stator 16, as caused by the undulating motion of the waves on the float.

In normal operation, in other words in acceptable sea conditions, each of the various converters supplies power to a landline 17 connecting the wavefarm to the nearest shore. The power generated by each is first conjoined in a control means unit, 18.

As is known, storm conditions may prevail occasionally. In this case, it may be necessary to extract the floats from the sea (or submerge them) to avoid damage thereto and the linear generator powered by them.

Figure 2:
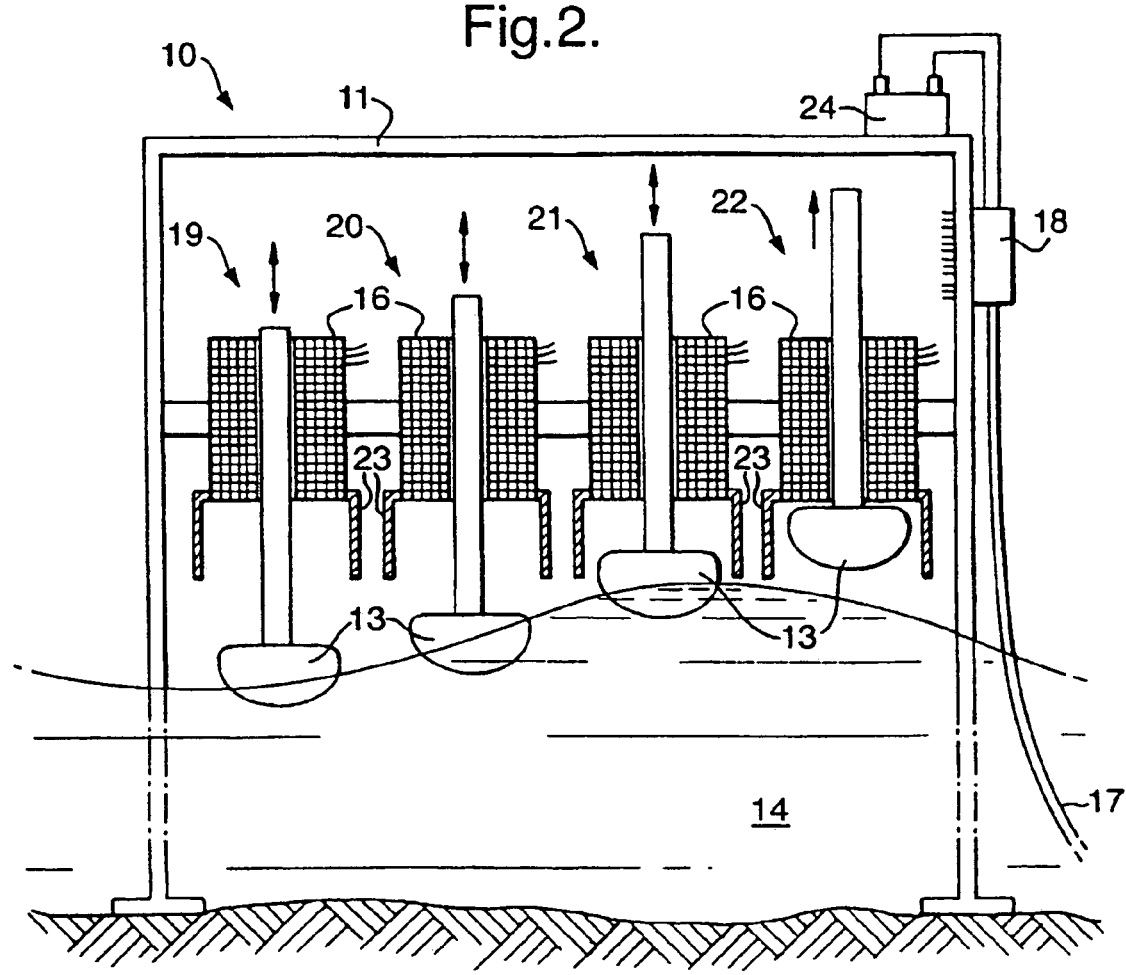
FIG. 2 shows the self-protection self-powered aspect of the invention in operation
Figure 4:
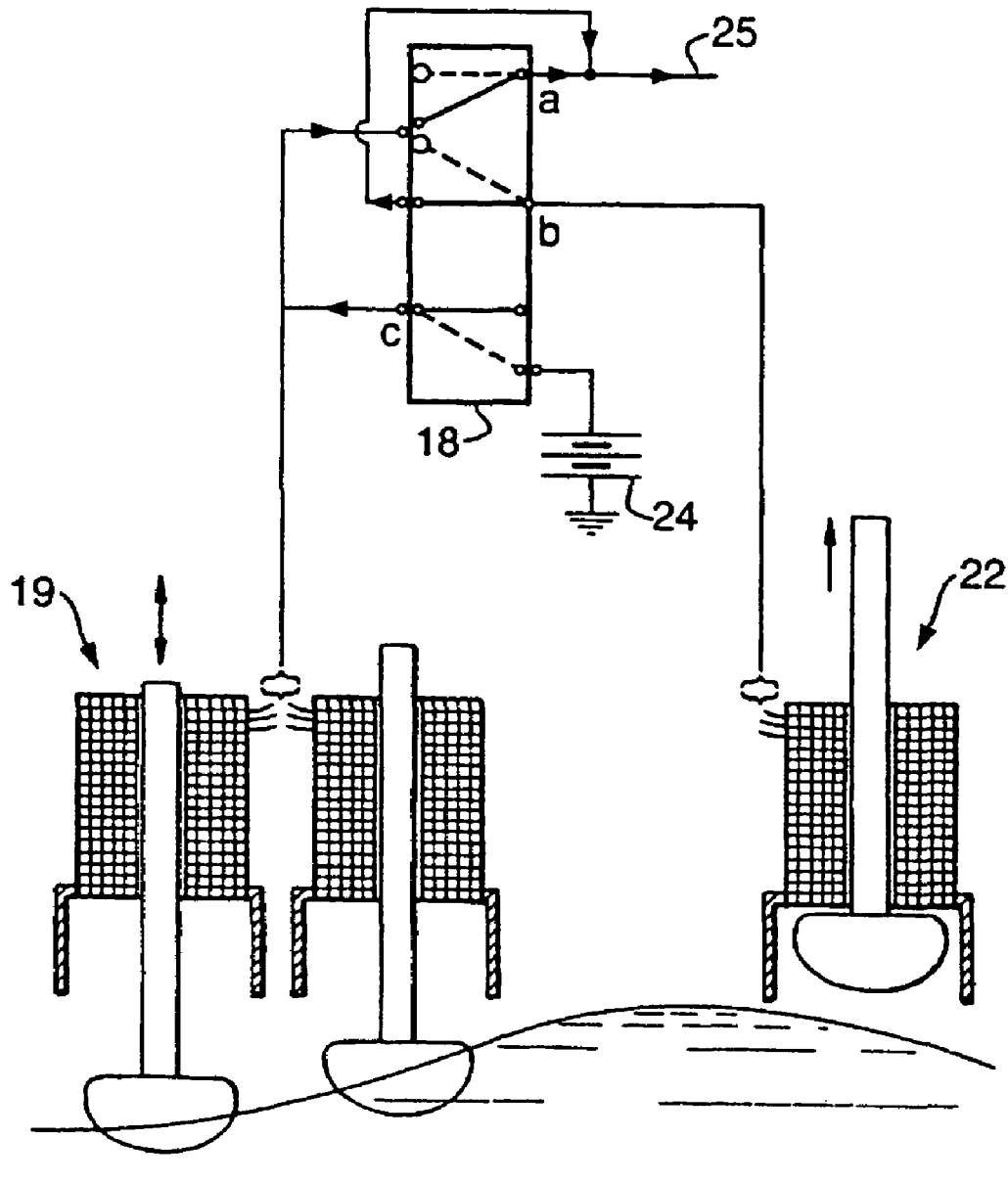

Referring to FIG. 2, such operation is effected by using energy supplied by the converters remaining in the sea, 19 &20 &21 to withdraw 22, and so on until all but the last one of two remain. This is shown at FIG. 4. Generators working in the sea, shown schematically here by 19, normally supply power to the landline 25, and thus to the shore, via the control unit 18, (switch 'a' in lower position). In the event of inclement conditions, switch a is turned off and switch 'b' is operated (upper position) to connect the power from generator 19 (and its colleagues) to generator 22, now operating in linear motor mode, so as to effect the removal of its float from the sea, as shown. The process repeats sequentially until all but the last few floats have been raised. Finally, switch 'c' is operated (lower position) to connect the last remaining converters with floats still in the sea, to the on board power source, indicated here and in FIG. 2 at 24. (This may be for example a storage battery, previously charged by the operative generators, or an electrical generator.) This power source provides power to lift the last of the floats from the sea. The floats remain extracted from the sea until such time as the storm has abated, when the normal switch positions are resumed.

Figure 3:
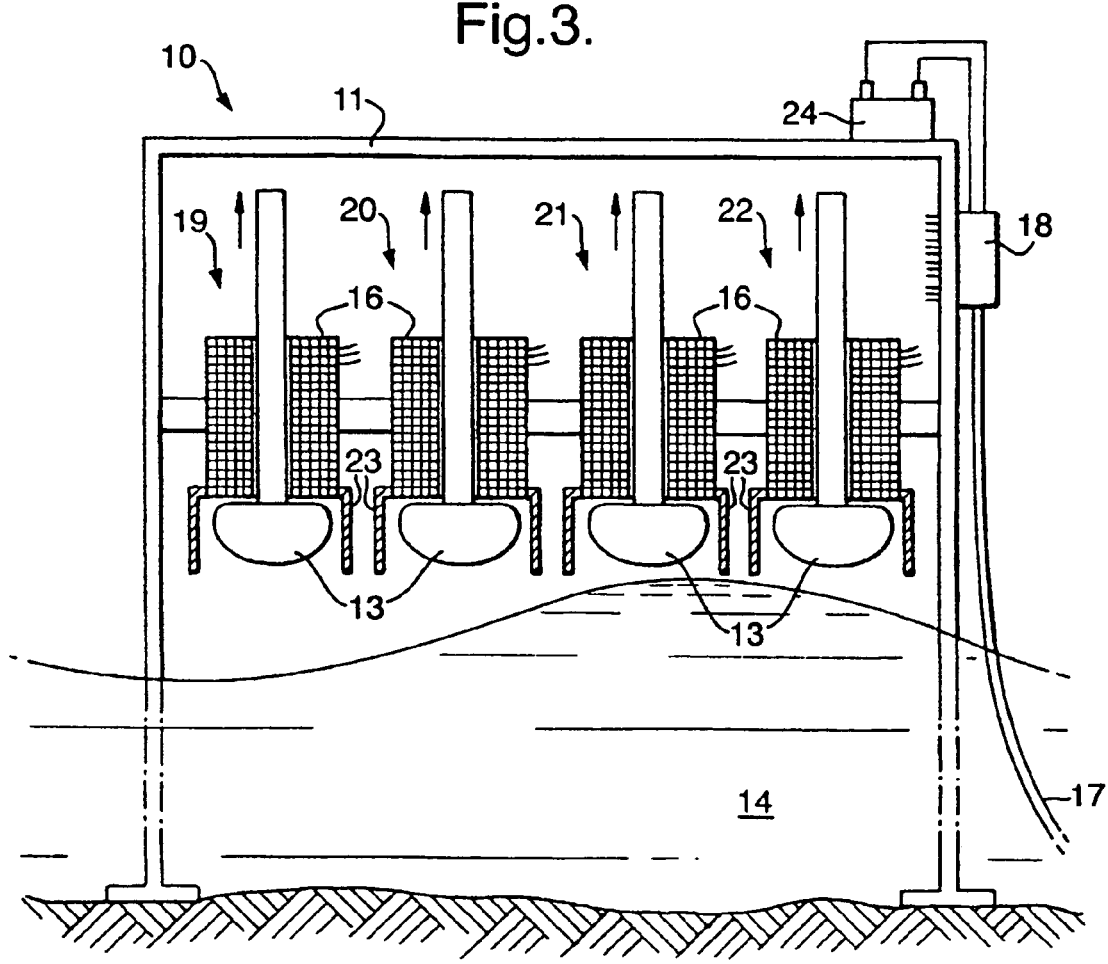
FIG. 3 shows all of the converters extracted from the sea and FIG. 4 is a block diagram showing the operation of the control unit of the wavefarm.

A wavefarm showing all of the floats withdrawn is shown in FIG. 3.

It will be appreciated that in a wavefarm having several thousand individual converters, batches of converters may be extracted at a time, so speeding up the process. Typically it may take less than five seconds to effect withdrawal of, say, a batch of one hundred converters out of a total of three thousand, thus the overall extraction time is only of the order of one hundred and fifty seconds, or less than three minutes, being well within the time needed for a storm to reach its full ferocity.

Numerous variations will be apparent to those skilled in the art.

The invention claimed is:

1. A self protecting wavefarm comprising:
   a number of wave energy converters, each converter comprising at least one float and being operable to move each float thereof between a first, electricity-generating, position at which the float is immersed in sea waves for driving the mechanical to electrical energy conversion by the converter and a second, protected position at which the movement of the float by sea waves is reduced or eliminated; and
   a control arrangement for effecting coordinated sequential operation of the converters to move their respective float or floats between their first and second positions in case of inclement sea conditions, the control arrangement being operative such that while the float or floats of at least one converter remain in the electricity generating position, the electrical energy generated by at least one such converter is used to power the other converter or converters to move their float or floats to their second positions, and thereafter, for at least one converter, for which no further converter would remain in a generating condition to supply the necessary power, the power to move its float or floats to their second position is supplied by an alternate source of energy.

2. A wavefarm according to claim 1 wherein the first and second positions of the float are at different elevations.

3. A wavefarm according to claim 1 wherein the alternate energy source is a store of energy previously converted from mechanical to electrical energy by the converters.

4. A wavefarm according to claim 1 wherein the alternate energy source is an electrical generator.

5. A wavefarm according to claim 1, wherein control apparatus is used, in response to inclement conditions, for directing the energy generated by one or more converters still operative in the sea to power the extraction or submersion of the other converters.

6. A wavefarm according to claim 1, in which the mechanical to electrical energy converters comprise linear generators and which in normal use convert the mechanical energy provided by the floats to electrical energy, but which, in the event of inclement conditions, are used instead as linear motors to either extract into protective cavities, or to submerge the point absorbers, to an extent sufficient to avoid damage thereto.

* * * * *